United States Patent [19]

Edwards

[11] Patent Number: 5,199,137
[45] Date of Patent: Apr. 6, 1993

[54] ROPE GUARD ASSEMBLY FOR WEDGE CLAMP

[75] Inventor: Franklin R. Edwards, Bloomfield Hills, Mich.

[73] Assignee: Nylube Products, Co., Rochester Hills, Mich.

[21] Appl. No.: 674,696

[22] Filed: Mar. 25, 1991

[51] Int. Cl.⁵ .............................................. F16G 11/00
[52] U.S. Cl. .................................. 24/136 K; 29/450; 29/517
[58] Field of Search ............ 24/136 R, 115 M, 136 K, 24/136 L, 136 B; 403/211, 314, 374, 409.1; 29/450, 517

[56] References Cited

U.S. PATENT DOCUMENTS

| | | | |
|---|---|---|---|
| 1,458,906 | 6/1923 | Morisette | 24/136 R |
| 1,644,904 | 10/1927 | West | 24/136 R |
| 4,250,734 | 2/1981 | Tinsley | 24/136 R X |
| 4,330,906 | 5/1982 | Werner | 24/136 R |
| 4,337,554 | 7/1982 | Sevrence | |
| 4,337,555 | 7/1982 | Franklin | |
| 4,718,788 | 1/1988 | Briscoe | 24/136 R X |

FOREIGN PATENT DOCUMENTS 31145 9/1921 Denmark ............................ 403/211

Primary Examiner—James R. Brittain
Attorney, Agent, or Firm—Harness, Dickey & Pierce

[57] ABSTRACT

A guard assembly which includes a bushing and assembly for securing the assembly in the slot of a wedge clamp. The bushing abuts a rope secured in the wedge clamp for preventing axial movement of the rope and wedge assembly which could loosen the securement of the rope.

22 Claims, 3 Drawing Sheets

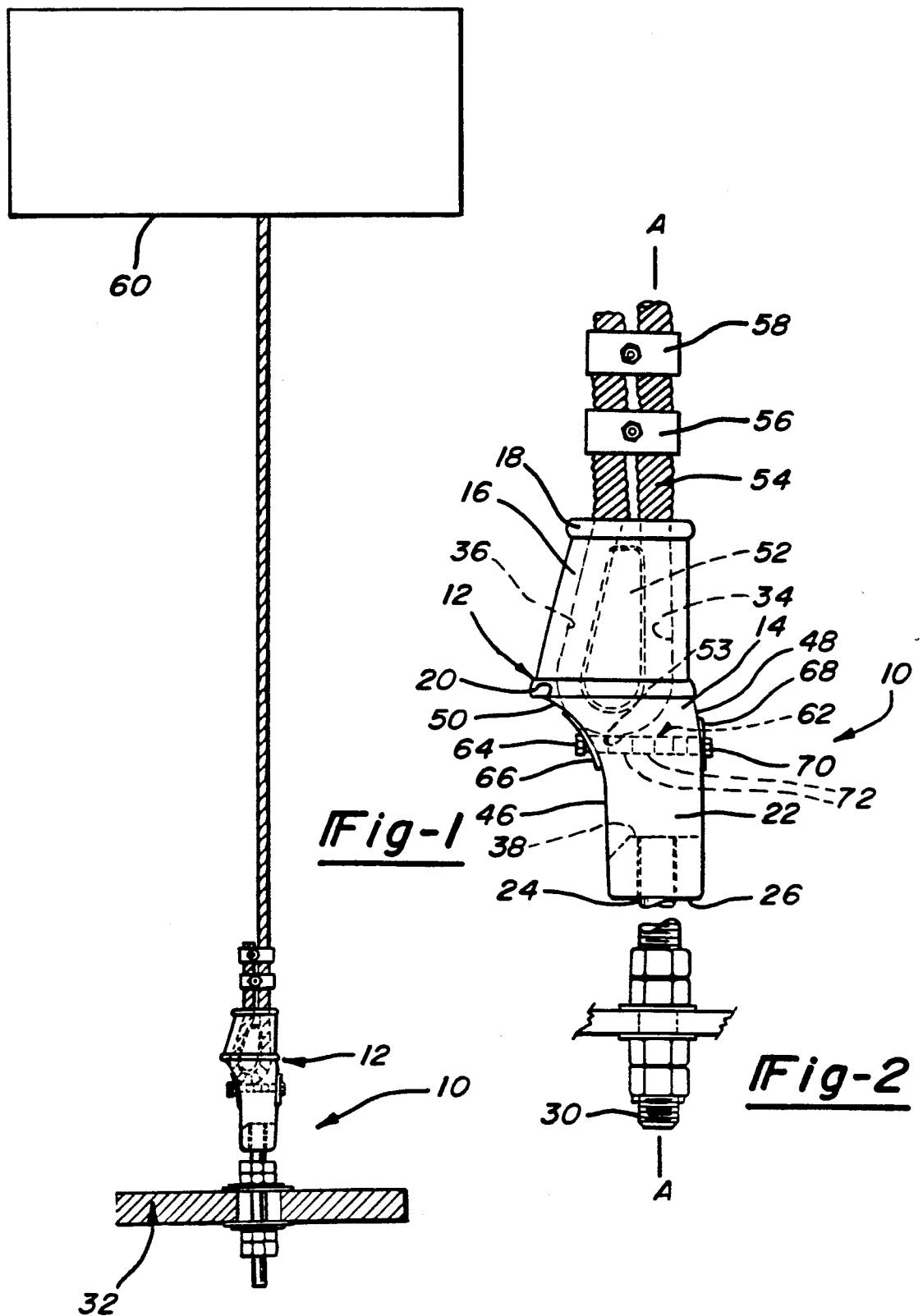

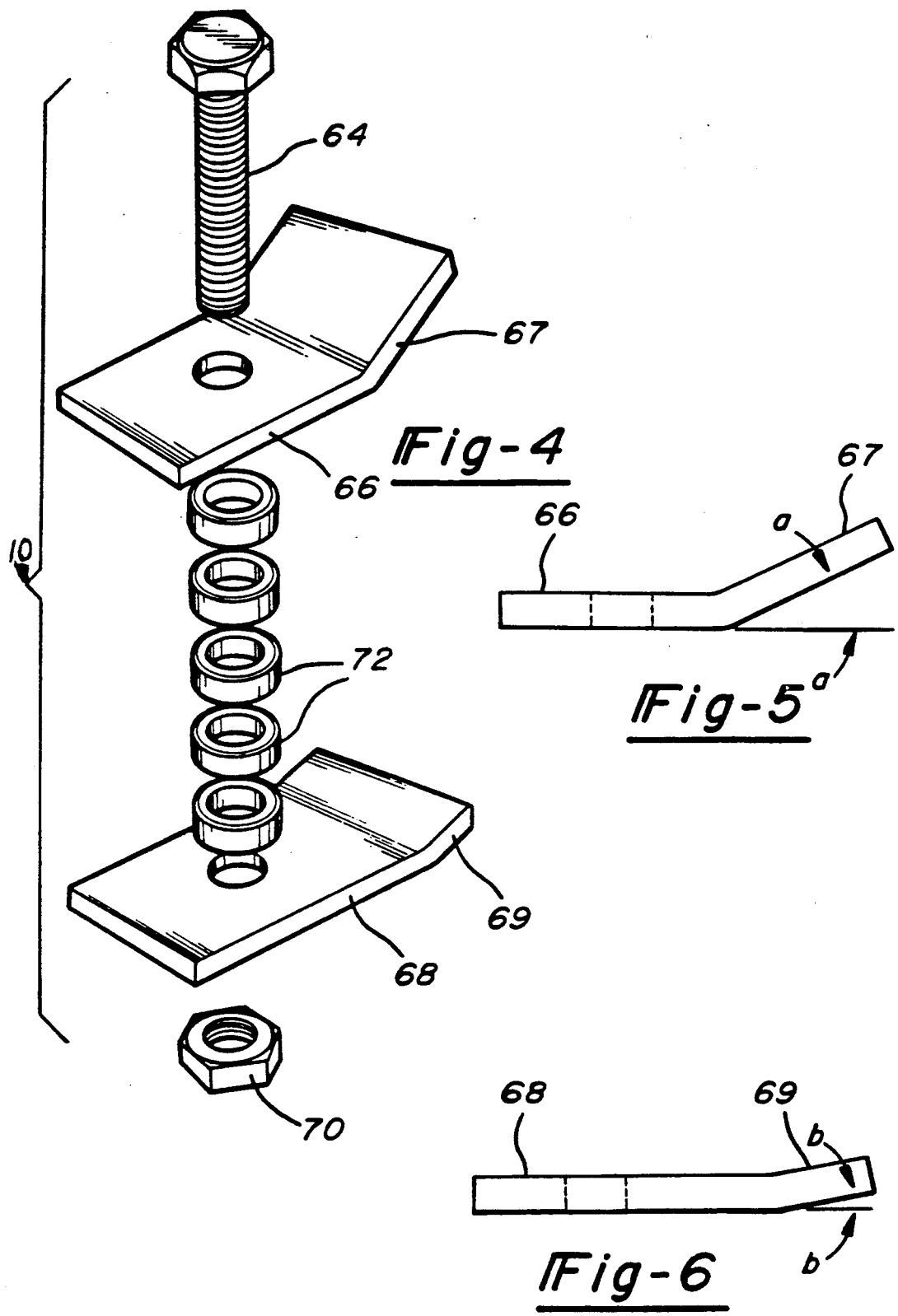

ROPE GUARD ASSEMBLY FOR WEDGE CLAMP

BACKGROUND OF THE INVENTION

The present invention relates to a rope wedge clamp of the type used for securing a cable or rope to an elevator car. More particularly, the present invention relates to a guard bracket for insuring the retention of clamping engagement of the elevator rope, even during periods of operation of the elevator car when slack cable conditions may be present.

In the past, ropes used in elevators have been secured by the use of babbitt and resin socket techniques. While such securement is generally adequate there are a number of drawbacks to this method. One drawback includes the lack of any means for adjustment of ropes once secured by this method. Also, there are safety problems inherent when using molten babbit in this method.

In recent years, the use of rope wedge clamps has become an increasingly popular alternative in such installations. Use of wedge clamps offer a number of advantages over previous rope termination and securement techniques. Some of these advantages include the ease of installation and adjustment provided by wedge clamps. Such wedge clamps also save in costs of labor versus the prior art methods due to easier installation and adjustment. Wedge clamps operate by securing the elevator rope between opposed angled walls of the wedge clamp and a tear drop shaped wedge around which the cable is wound. The wedge acts to cam the rope against the walls of the wedge clamp during tensioning of the ropes. Such wedge clamps are designed to meet or exceed the relevant requirements for rope connections in elevator installations.

While such wedge clamps have been extremely advantageous and cost effective in the securement of ropes to elevator car structures and the like, the wedge clamps rely on tension on the rope to provide secure engagement of the rope in the wedge clamp. Under certain conditions the rope may slacken reducing tension on the wedge clamp assembly which in a very small minority of cases may cause some slippage in the rope engaged in the wedge clamp. For instance, at times the elevator cars may be out of adjustment such that they "bottom out" or "top out" on either the bottom or the top of the elevator shaft. At these times they may be slack in the rope which may loosen the wedge clamp enough to cause the rope to slip around the wedge. This may cause enough slippage to require readjustment of the cable in the assembly. In other cases such as in a free spool test procedure, the elevator car is dropped by allowing the drive mechanism to "free-spool". Under the free-spool condition emergency brakes engage the elevator car which again produces slack in the ropes. Because in some areas such testing is mandatory at yearly intervals, readjustment of the ropes is often necessary after completion of the test. Thus, in certain situations it is desirable to provide a guard against such disengagement of the wedge in the clamp, which could cause rope slippage.

Therefore, it is a goal in the art to provide a simple inexpensive guard and method which would lessen the chance of rope slippage in such wedge clamps.

SUMMARY OF THE INVENTION

In the present invention a rope guard assembly for a wedge clamp is provided. The guard is useful in a wedge clamp assembly which includes a load bearing body portion with a load bearing axis defined therethrough. The body portion of the wedge clamp assembly includes a rope connection portion which has a first end and a second end. A rod connection portion is connected at the second end. The first wedge shaped portion includes surfaces forming a wedge shaped slot extending through the body for receiving a rope wrapped around a rope wedge in secured engagement under load. Surfaces are formed in the rod connection portion to provide a second slot portion extending from side to side through the rod connection portion and communicating with the wedge shaped slot. The rope guard assembly of the present invention in its essence includes an abutment means for abutting a rope secured in the wedge shaped slot for securing the rope in the wedge clamp thereby guarding against axial movement of the rope and wedge assembly which could loosen the securement of the rope and wedge assembly in the wedge shaped slot. A method for securing the rope and wedge assembly against axial movement is also provided.

The present invention thus, guards against the possibility of slipping ropes under slackened rope conditions.

Additional benefits and advantages of the present invention will become apparent to those skilled in the art from the subsequent description of the preferred embodiment and the appended claims taken in conjunction with the accompanying drawings.

BRIEF DESCRIPTION OF THE DRAWINGS

FIG. 1 is a plan view, partially in phantom, showing a wedge clamp assembly with the guard of the present invention utilized therein in a typical elevator environment;

FIG. 2 is a detailed plan view of the assembly of FIG. 1;

FIG. 4 is an exploded perspective view of the rope guard assembly made in accordance with the teachings of the present invention;

FIG. 5 is a side view showing the angular relationship of a first securement plate of the present invention; and FIG. 6 is a view similar to FIG. 5 showing a second securement plate of the present invention.

DETAILED DESCRIPTION OF THE PREFERRED EMBODIMENTS

Figure 3:
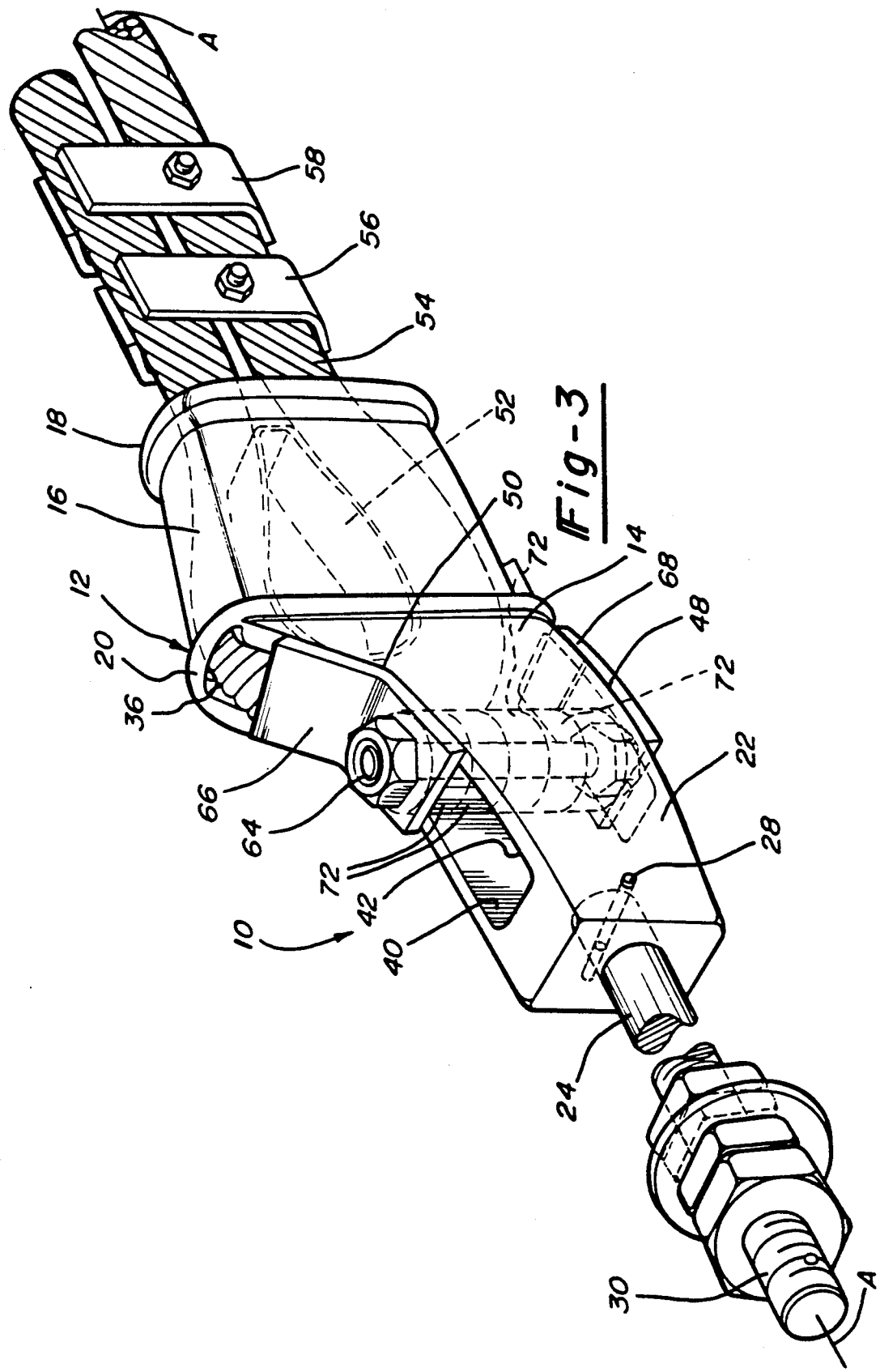
FIG. 3 is a perspective view of a typical wedge clamp assembly utilizing the rope guard assembly of the present invention.

In accordance with the present invention there is provided a rope guard assembly generally shown at 10 which is useful in a wedge clamp assembly generally indicated at 12.

Wedge clamp assemblies are known to those skilled in the art. FIGS. 1, 2 and 3 are representative of a typical wedge clamp 12 which utilizes the novel rope guard assembly 10 of the present invention.

Referring now to FIGS. 1, 2 and 3, the wedge clamp assembly 12 includes a load bearing body portion 14 which has a load bearing axis A—A. The body portion 14 includes a first wedge shaped portion 16 which includes a narrow end 18 and a wider end 20. The body 14 also includes a second rod connection portion 22 which is attached to the wedge shaped portion at its wider end 20. The rod connection portion 22 includes a shackle rod 24 secured in a bore in its terminal end 26 by way of a pin 28. Shackle rod 24 includes a threaded end 30 which may be utilized for attaching the wedge clamp to an elevator car for instance, as generally indicated schematically in FIG. 1 by numeral 32.

The wedge shaped portion 16 includes an axially extending wedge shaped slot generally shown in phantom by surfaces 34 and 36, which communicates to a second slot in the rod connection portion 22 which has a terminal wall 38 and side walls 40 and 42. Side walls 40 and 42 also form the enclosures for the wedge shaped slot. The second slot formed by terminal wall 38 and walls 40 and 42 is in communication with the wedge shaped slot. The second slot extends through the sides 44 and 46 of the rod connection portion 22, i.e. through the width of the rod connection portion 22. The rod connection portion 22 is connected to the wedge shaped portion 16 at the sides 44 and 46 with arcuate walls 48 and 50.

A rope wedge 52 shown in phantom in the figures is provided for securing the rope 54 within the wedge shaped slot formed by walls 34 and 36. The rope 54 is wound around the wedge 52 and back outward from the narrow axial end 18. Thereafter, the rope, as it is placed under tension, will tend to pull the wedge assembly into the wedge shaped slot formed by walls 34 and 36, which thereby secures the rope between the wedge 52 and the respective walls 34 and 36. Rope clamps 56 and 58 are provided in such installations to generally secure the free end of the rope 54 to the rope portion under tension. The other end of the cable is connected to conventional elevator drive mechanisms known to those skilled in the art, generally represented at 60.

As described in the background of the present application, upon operation of the elevator a certain amount of slack in the rope in the axial direction (along load axis A—A) may occasionally occur. This slack in the axial direction may cause the wedge 52 to move axially toward the terminal end 26 which may tend to loosen the rope 54 in its engagement between the wedge 52 and the walls 34 and 36. This loosening is often not a problem but upon occasion when loosening occurs the rope 54 may slip in an axial direction which may require readjustment of the rope 54. Since several rope and wedge clamp assemblies are generally used on a typical elevator installation, a slipped rope may cause an out of balance condition of the elevator and may inhibit elevator operation until readjustment is accomplished.

In accordance with the improvement of the present invention, a rope guard assembly 10 is provided which includes an abutment means, such as generally indicated at 62, which abuts a rope secured in the wedge clamp assembly. This guards against axial movement of the rope and wedge assembly, during slack rope conditions, which could loosen the securement of the rope and wedge assembly in the wedge shaped slot of the wedge clamp assembly.

Referring now to FIGS. 4 through 6, a preferred embodiment of a rope guard assembly 10 of the present invention is illustrated. The rope guard assembly 10 includes a bolt 64, first and second securement plates 66 and 68, a nut 70, and a plurality of bushings 72. The first securement plate 66 includes a portion at an angle a of about 26 ½ degrees for conforming to the arcuate wall 50 of the rod connection portion. Second securement plate 68 includes an angled portion 69 which is angled at an angle b of about 12 degrees also for conforming to the arcuate wall 48 of the rod connection portion.

In operation, the guard member is secured in the slot formed by walls 40 and 42 with the bushings encircling the bolt 64. Because of the angled portions 67 and 69 the plates 66 and 68 may be securely attached by clampingly engaging sides 44 and 46 of the rod connection portion 22.

The rope guard assembly 10 is attached such that the bushings 72 are immediately adjacent the axially inward most end 53 of the rope 54 wound about the wedge 52. Thus, in operation with the plates 66 and 68 clampingly engaging sides 44 and 46 by the nut and bolt assembly 64 and 70 holding the bushing in place against the end 53 of cable 54. Because the bushings 72 engage the end 53 of rope 54 the rope 54 is substantially prevented from axial movement which could loosen the wedge clamp and rope assembly thereby producing slippage of the rope.

In a preferred embodiment, the bushing means 72 includes a plurality of cylindrical type bushings, which are made of a nylon material. It is critical in the present invention that the material of which the bushing is made is softer than the rope such that no fraying may occur at the contact point between the bushing 72 and the cable 54. The bushing however could be a single cylindrical piece or of any other advantageous cross-sectional shapes such as hexagonal or square which may act to additionally secure the bushing from rotation in the second slot.

In accordance with the method of the present invention the cable is secured under tension in the wedge clamp assembly. The rope guard bushing 72 is placed adjacent the rope 54 at end 53 with plates 66 and 68 flush with the sides 44 and 46 and arcuate walls 48 and 50 of the wedge clamp the nut and bolt assembly is tightened such that the bushing is secured from axial movement by the clamping engagement imparted on the sides 44 and 46 and arcuate walls 48 and 50 vial nut and bolt assembly acting on the plates 66 and 68. The bushing is placed in a position such that axial movement of the rope is substantially prevented under normal operating conditions. Thus, this ensures proper securement of the rope in the wedge clamp even during slackened rope conditions.

While the above description constitutes the preferred embodiment of the present invention, it is to be appreciated that the invention is susceptible to modification, variation and change without departing from the proper scope and fair meaning of the accompanying claims.

What is claimed is:

1. In a rope wedge clamp assembly having a load bearing body portion with a load bearing axis therethrough, said body portion including a rope securement portion having a first end and a second end and a rod connection portion at said second end, said rope securement portion including surfaces forming a wedge shaped slot extending through the body for receiving a rope and wedge assembly in secured engagement under load, a surface forming a second slot extending from side through the rod connection portion and communicating with said wedge shaped slot; the improvement comprising a rope guard comprising:

abutment means secured within said second slot for abutting a rope secured in the wedge shaped slot thereby preventing axial movement of said rope and wedge assembly which could loosen, said securement of said rope and wedge assembly in said wedge shaped slot.

2. The rope guard of claim 1 wherein said abutment means further comprises a bushing abutment secured in said second slot for resisting movement of said rope.

3. The rope guard of claim 1 wherein said abutment means further comprises at least one bushing made of a material softer than the rope which is clampingly secured in said second slot between the sides of said rod connection portion.

4. The rope guard of claim 3 further comprising a bolt means surrounded by said at least one bushing, said bolt means clampingly securing a pair of plates on each side of said rod connection portion.

5. The rope guard of claim 4 wherein said plates are shaped to conform to the sides of said body portion.

6. The rope guard of claim 5 wherein said plates include an angular bend therein for partially sealing a slot opening formed in the wedge clamp.

7. The rope guard of claim 3 further comprising a plurality of said bushings.

8. The rope guard of claim 3 wherein said at least one bushing is a nylon bushing.

9. A rope wedge clamp assembly comprising:
   a load bearing body portion including a load bearing axis therethrough, said body portion including a rope securement portion having a first end and a second end and a rod connection portion extending from said second end and including pair of sides on a width thereof; first surfaces forming a generally axially extending wedge shaped slot open at said first end and said second end, said wedge shaped slot for providing secured engagement of a rope and wedge assembly under tension in a first axial direction;
   second surfaces forming a second slot in communication with said wedge shaped slot, said second slot extending through said pair of sides on the width of the rod connection portion;
   bushing means for positioning within said second slot in abutting engagement with a portion of said rope and wedge assembly secured in the wedge shaped slot; and
   means for securing said bushing means in said second slot whereby axial movement of said rope and wedge assembly in a second axial direction, which would tend to loosen the clamping engagement of the rope in the assembly, is substantially prevented.

10. The wedge clamp assembly of claim 9 wherein said bushing means is made of a material which is softer than said rope.

11. The wedge clamp assembly of claim 9 wherein said bushing means further comprises a hollow bushing and said means for securing said bushing means further comprises a bolt inserted through said bushing means which clampingly engages said pair of sides of said rod connection portion.

12. The wedge clamp assembly of claim 11 further comprising a plurality of hollow bushings forming said bushing means.

13. The wedge clamp assembly of claim 11 wherein a pair of arcuate sides connect said rod connection portion with the second end of said rope securement portion, and said means for securing said bushing means further comprises a pair of plates for clampingly engaging said pair of sides wherein each plate of said pair of plates includes a bent portion therein for conforming to said pair of arcuate sides.

14. A method of securing an elevator rope and wedge in a wedge clamp for guarding against movement of the rope and wedge in an axial direction which could cause loosening of the rope, the wedge clamp being of the type having a load bearing body portion with a load bearing axis therethrough, the body portion including a rope securement portion having a first end and a second end, the body portion having a rod connection portion extending from the second end, the rope securement portion including surfaces forming a generally axially extending wedge shaped slot extending through the rope securement portion and open at the first and second ends, the wedge shaped slot providing for secured engagement of a rope and wedge held under tension in a first axial direction; and second surfaces in said rod connection portion for forming a second slot extending through a width of the rod connection portion; said method comprising the steps of:
   a) securing said rope and wedge under tension in the wedge shaped slot;
   b) providing an abutment including means for securing said abutment in said second slot for abutting said rope; and
   c) securing the abutment in the second slot immediately adjacent the rope whereby the rope and wedge clamp are secured against movement in a second axial direction which could cause loosening of the rope.

15. The method of claim 14 wherein the abutment further comprises a bushing made of a material softer than said rope.

16. The method of claim 14 wherein said means further comprises a nut and bolt assembly and said abutment further comprises a bushing about the bolt, said nut and bolt for clampingly securing the bushing in the second slot.

17. The method of claim 16 wherein said nut and bolt assembly further comprises a pair of plates for securement about the width of said rod connection portion.

18. The method of claim 17 wherein said plates are shaped to conform to contours of the body portion of said wedge clamp.

19. The method of claim 14 wherein said rope extends into said second slot and has an axially innermost portion, said abutment abutting the axially innermost end of said rope.

20. In a rope wedge clamp assembly having a load bearing body portion with a load bearing axis therethrough, said body portion including a rope securement portion having a first end and a second end and a rod connection portion extending from said second end, said rope securement portion including surfaces forming a wedge shaped slot extending through the body for receiving a rope and wedge assembly in secured engagement under load, a surface forming a second slot extending from side to side through the rod connection portion and communicating with said wedge shaped slot; the improvement comprising a rope guard comprising:
   abutment means secured within said second slot for abutting a rope secured in the wedge shaped slot thereby preventing axial movement of said rope and wedge assembly which could loosen said securement of said rope and wedge assembly in said wedge shaped slot, said abutment means further comprising at least one bushing made of a material that is softer than said rope which is clampingly secured in said second slot between the sides of said rod connection portion by a bolt means that clampingly secures a pair of plates on each side of said rod connection portion.

21. A rope wedge clamp assembly comprising:
a load bearing body portion including a load bearing axis therethrough, said body portion including a rope securement portion having a first end and a second end and a rod connection portion extending from said second end and including a pair of sides on a width thereof; first surfaces forming a generally axially extending wedge shaped slot open at said first end and said second end, said wedge shaped slot for providing secured engagement of a rope and wedge assembly under tension in a first axial direction; second surfaces forming a second slot in communication with said wedge shaped slot, said second slot extending through said pair of sides on the width of the rod connection portion;
hollow bushing means for positioning within said second slot immediately adjacent a portion of said rope and wedge assembly secured in the wedge shaped slot; and
bolt means, for insertion through said hollow bushing means, that clamping engages said pair of sides of said rod connection portion such that said bushing means is secured in said slot whereby axial movement of a rope and wedge assembly in a second axial direction, which would tend to loosen the clamping engagement of the rope in the assembly, is substantially prevented.

22. A method of securing an elevator rope and wedge in a wedge clamp for guarding against movement of the rope and wedge in an axial direction which could cause loosening of the rope, the wedge clamp being of the type having a load bearing body portion with a load bearing axis therethrough, the body portion including a rope securement portion having a first end and a second end, the body portion having a rod connection portion extending from the second end, the rope securement portion including surfaces forming a generally axially extending wedge shaped slot extending through the rope securement portion and open at the first and second ends, the wedge shaped slot providing for secured engagement of a rope and wedge held under tension in a first axial direction; and second surfaces in said rod connection portion for forming a second slot extending through a width of the rod connection portion; said method comprising the steps of:
(a) securing a rope and wedge under tension in the wedge shaped slot such that said rope extends into said second slot and has an axially innermost portion;
(b) providing an abutment including means for securing said abutment in said second slot for abutting said rope, said abutment abutting the axially innermost portion of said rope; and
(c) securing the abutment in the second slot immediately adjacent the rope whereby the rope and wedge clamp are secured against movement in a second axial direction which could cause loosening of the rope.

* * * * *